United States Patent
Gazit et al.

(10) Patent No.: US 11,157,177 B2
(45) Date of Patent: Oct. 26, 2021

(54) HICCUP-LESS FAILBACK AND JOURNAL RECOVERY IN AN ACTIVE-ACTIVE STORAGE SYSTEM

(71) Applicant: EMC IP Holding Company LLC, Hopkinton, MA (US)

(72) Inventors: Ronen Gazit, Tel Aviv (IL); Oran Baruch, Tel Aviv (IL); Jenny Derzhavetz, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

(21) Appl. No.: 16/819,336

(22) Filed: Mar. 16, 2020

(65) Prior Publication Data

US 2021/0286515 A1 Sep. 16, 2021

(51) Int. Cl.
*G06F 11/14* (2006.01)
*G06F 3/06* (2006.01)

(52) U.S. Cl.
CPC .............. *G06F 3/061* (2013.01); *G06F 3/067* (2013.01); *G06F 3/0655* (2013.01); *G06F 11/1456* (2013.01)

(58) Field of Classification Search
None
See application file for complete search history.

(56) References Cited

U.S. PATENT DOCUMENTS

| | | | |
|---|---|---|---|
| 7,058,848 B2 * | 6/2006 | Sicola | G06F 11/2007 |
| | | | 707/999.201 |
| 8,898,409 B1 | 11/2014 | Natanzon et al. | |
| 9,747,180 B1 | 8/2017 | Fair | |
| 9,817,732 B1 | 11/2017 | Fair | |
| 10,152,424 B1 | 12/2018 | Xu et al. | |
| 10,324,782 B1 | 6/2019 | Dorfman et al. | |
| 10,558,613 B1 | 2/2020 | Shveidel et al. | |

OTHER PUBLICATIONS

Shveidel, et al.; "Efficient Handling of Highly Amortized Metadata Page Updates in Storage Clusters With Delta Log-Based Architectures," U.S. Appl. No. 16/742,076, filed Jan. 14, 2020.

* cited by examiner

*Primary Examiner* — Brian R Peugh
(74) *Attorney, Agent, or Firm* — BainwoodHuang (57) ABSTRACT

Techniques for providing hiccup-less failback and journal recovery. The techniques include determining a head position of a data log of a primary node and placing a marker at a corresponding position in a data log of a secondary node. In response to an IO request, the head of the primary log is moved to allocate space for writing a data entry, and the secondary node is directed to move a head of the secondary log to allocate space for writing the data entry. In response to a data entry being flushed from the primary node, a tail of the primary log is moved to reclaim allocated space for a previous data entry, and the secondary node is directed to move a tail of the secondary log to reclaim previously allocated space. In response to a tail of the secondary log coinciding with the marker position, content of the logs is synchronized.

20 Claims, 6 Drawing Sheets

HICCUP-LESS FAILBACK AND JOURNAL RECOVERY IN AN ACTIVE-ACTIVE STORAGE SYSTEM

BACKGROUND

Active-active storage systems enable multiple data storage processors (also referred to herein as "storage nodes") in high availability storage clusters to simultaneously have storage input/output (IO) access to the same storage objects (e.g., volumes, logical units (LUs), file systems) or other shared resources. In response to receipt of a write IO request for a storage object (e.g., a volume, a logical unit (LU), a file system) from a host computer, a storage node of a storage cluster writes data (e.g., user data, metadata) associated with a page (e.g., a data page, a metadata page) to a journal in local memory before storing the data to a storage array. Once the data have been written to the journal, the storage node sends an acknowledgement message to the host computer that issued the write IO request. The storage node subsequently stores the data to the associated page in the storage array.

SUMMARY

In a storage cluster, a storage node can write data (e.g., user data, metadata) to both a journal in volatile memory and a persistent log (also referred to herein as a "data log") in persistent memory. In certain implementations, the persistent memory of a storage node can be implemented as persistent RAM-based storage (also referred to herein as "persistent RAM"), which can retain its data content following a power failure, a system crash, a normal system shutdown, or other event in which electrical power is lost or removed. For example, such persistent RAM can be implemented using a non-volatile dual in-line memory module (NVDIMM), 3D Cross Point ("3D XPoint") technology, an independent battery-backup system, or any other suitable non-volatile persistent memory and/or battery-backup technology.

Such use of persistent RAM in storage nodes of a storage cluster can have shortcomings, however, particularly with regard to maintaining up-to-date contents of data logs following the loss or removal of electrical power. For example, in an active-active storage system that includes a primary storage node and a secondary storage node, a failover process can be executed when the primary or secondary storage node fails or otherwise becomes non-operational. During the failover process, the primary (or secondary) storage node (also referred to herein as the "surviving node") can continue to service storage IO requests (e.g., write IO requests, read IO requests) issued by host computers, as well as provide up-to-date data to the data log in its local persistent RAM. Once the non-operational secondary (or primary) storage node (also referred to herein as the "failback node") again becomes operational, a failback process can be executed to restore the failback node from its non-operational state back to its original working state.

During the failover process, however, the surviving node can only have direct access to the data log in its own local persistent RAM. The surviving node can therefore be incapable of providing up-to-date data to the data log in the local persistent RAM of the failback node. As a result, once the failback node is brought back to its original working state during the failback process, its data log can lack at least some of the data provided to the data log of the surviving node during the failover process. In other words, the data content of the data log of the failback node may not be up-to-date and synchronized with the data content of the data log of the surviving node.

Techniques are disclosed herein for providing hiccup-less failback and journal recovery in an active-active storage system. The disclosed techniques can be practiced in an active-active storage system that includes at least a primary storage node communicably connected to a secondary storage node. Each of the primary and secondary storage nodes can be configured to write data to both a journal in its local volatile memory (e.g., RAM) and a persistent log (or "data log") in its local persistent memory (e.g., persistent RAM). In certain implementations, the data log in the local persistent RAM of each storage node can be configured as a ring buffer having a head pointer and a tail pointer. The disclosed techniques can include, during a failback process, determining a position of the head pointer of the data log of the primary storage node (also referred to herein as the "primary data log"), and placing a marker at a corresponding location in the data log of the secondary storage node (also referred to herein as the "secondary data log"). In certain implementations, the marker can correspond to a data entry that includes at least a transaction identifier (ID) (e.g., a sequence ID).

The disclosed techniques can further include, in response to at least one storage IO request being received at the primary storage node, moving the head pointer of the primary data log to allocate space for writing at least one data entry to the primary data log, and directing the secondary storage node to move the head pointer of the secondary data log to allocate corresponding space for writing a copy of the data entry to the secondary data log. In response to at least one data entry being flushed from the journal of the primary storage node, the tail pointer of the primary data log can be moved to reclaim previously allocated space in the primary data log for at least one corresponding data entry, and the secondary storage node can be directed to move the tail pointer of the secondary data log to reclaim corresponding allocated space in the secondary data log. In response to a position of the tail pointer of the secondary data log coinciding with the location of the marker, a determination can be made that the data content of the respective primary and secondary data logs is up-to-date and synchronized. The secondary storage node can then resume servicing storage IO requests (e.g., write IO requests, read IO requests) issued by the respective host computers. In this way, synchronization of the data logs of the respective primary and secondary storage nodes can be achieved during a failback process with reduced suspend time of the active-active storage system.

In certain embodiments, a method of providing hiccup-less failback and journal recovery in a storage cluster is performed, in which the storage cluster includes at least a primary node and a failback node, and each of the primary and failback nodes includes a data log in persistent random-access memory (RAM). The method includes, in a failback process, placing a marker at a location in the data log of the failback node corresponding to a position of a head pointer of the data log of the primary node, and, in response to at least one data entry being flushed from the primary node, moving a tail pointer of the data log of the failback node to reclaim allocated space for at least one corresponding data entry. The method further includes determining that a position of the tail pointer of the data log of the failback node coincides with the location of the marker, thereby indicating that the data log of the failback node is synchronized with the data log of the primary node.

In certain arrangements, the method further includes, in response to a first write input/output (IO) request being received at the primary node, moving the head pointer of the data log of the primary node to allocate space for writing at least one first data entry.

In certain arrangements, a position of a head pointer of the data log of the failback node coincides with the location of the marker. The method further includes moving the head pointer of the data log of the failback node to allocate corresponding space for writing a copy of the first data entry.

In certain arrangements, the method further includes writing the at least one first data entry to the allocated space in the data log of the primary node.

In certain arrangements, the method further includes writing the copy of the first data entry to the allocated space in the data log of the failback node.

In certain arrangements, the method further includes, prior to determining that the data log of the failback node is synchronized with the data log of the primary node, deferring servicing storage IO requests at the failback node.

In certain arrangements, the method further includes, having determined that the data log of the failback node is synchronized with the data log of the primary node, resuming the servicing of the storage IO requests at the failback node.

In certain embodiments, a system for providing hiccup-less failback and journal recovery in a storage cluster includes a primary node including a journal in volatile random-access memory (RAM), and a data log in persistent RAM; and, a failback node including a journal in volatile random-access memory (RAM), and a data log in persistent RAM. In a failback process, the primary node is configured to execute program instructions to place a marker at a location in the data log of the failback node corresponding to a position of a head pointer of the data log of the primary node, and, in response to at least one data entry being flushed from the journal of the primary node, to direct the failback node to move a tail pointer of the data log of the failback node to reclaim allocated space for at least one corresponding data entry. The primary node is further configured to execute the program instructions to determine that a position of the tail pointer of the data log of the failback node coincides with the location of the marker, thereby indicating that the data log of the failback node is synchronized with the data log of the primary node.

In certain arrangements, the primary node is further configured to execute the program instructions, in response to a first write input/output (IO) request being received at the primary node, to move the head pointer of the data log of the primary node to allocate space for writing at least one first data entry.

In certain arrangements, a position of a head pointer of the data log of the failback node coincides with the location of the marker. The primary node is further configured to execute the program instructions to direct the failback node to move the head pointer of the data log of the failback node to allocate corresponding space for writing a copy of the first data entry.

In certain arrangements, the primary node is further configured to execute the program instructions to write the at least one first data entry to the allocated space in the data log of the primary node.

In certain arrangements, the primary node is further configured to execute the program instructions to direct the failback node to write the copy of the first data entry to the allocated space in the data log of the failback node.

In certain arrangements, the failback node is configured to execute program instructions, prior to a determination that the data log of the failback node is synchronized with the data log of the primary node, to defer servicing storage IO requests at the failback node.

In certain arrangements, the failback node is further configured to execute the program instructions, in response to the determination that the data log of the failback node is synchronized with the data log of the primary node, to resume the servicing of the storage IO requests at the failback node.

In certain arrangements, the data log of each of the primary node and the failback node is configured as a ring buffer.

In certain embodiments, a computer program product includes a set of non-transitory, computer-readable media having instructions that, when executed by processing circuitry, cause the processing circuitry to perform a method including, in a failback process of a storage cluster including at least a primary node and a failback node, placing a marker at a location in a data log of the failback node corresponding to a position of a head pointer of a data log of the primary node, and, in response to at least one data entry being flushed from the primary node, moving a tail pointer of the data log of the failback node to reclaim allocated space for at least one corresponding data entry. The method further includes determining that a position of the tail pointer of the data log of the failback node coincides with the location of the marker, thereby indicating that the data log of the failback node is synchronized with the data log of the primary node.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of the active-active storage system included in the data storage environment of FIG. 1a;

FIG. 2 is a block diagram of volatile memory, persistent memory, and storage array components of a storage node in the data storage environment of FIG. 1a;

DETAILED DESCRIPTION

Techniques are disclosed herein for providing hiccup-less failback and journal recovery in an active-active storage system. The disclosed techniques can include, during a failback process, determining a position of a head pointer of a data log of a primary storage node (also referred to herein as the "primary data log"), and placing a marker at a corresponding location in a data log of a secondary storage node (also referred to herein as the "secondary data log"). In response to at least one storage IO request being received at the primary storage node, the head pointer of the primary data log can be moved to allocate space for writing at least one data entry to the primary data log, and the secondary storage node can be directed to move a head pointer of the secondary data log to allocate space for writing a copy of the data entry to the secondary data log. In response to at least one data entry being flushed from a journal of the primary storage node, a tail pointer of the primary data log can be moved to reclaim previously allocated space in the primary data log for at least one corresponding data entry, and the secondary storage node can be directed to move a tail pointer of the secondary data log to reclaim corresponding allocated space in the secondary data log. In response to a position of the tail pointer of the secondary data log coinciding with the location of the marker, a determination can be made that data content of the respective primary and secondary data logs are up-to-date and synchronized. The secondary storage node can then resume servicing storage IO requests. In this way, synchronization of the primary and secondary data logs can be achieved during the failback process with reduced suspend time of the active-active storage system.

Figure 1A:
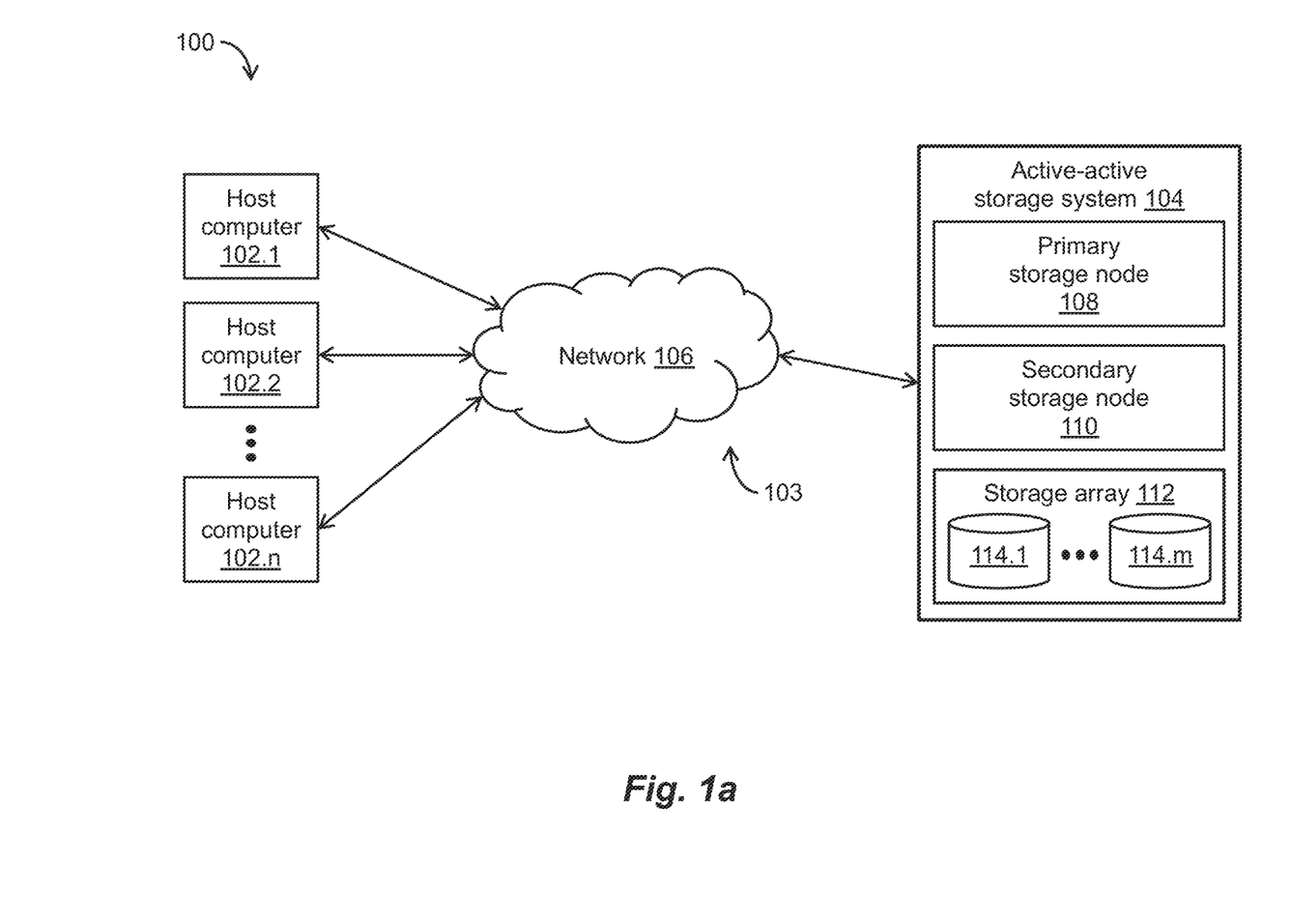
FIG. 1a is a block diagram of an exemplary data storage environment, in which techniques can be practiced for providing hiccup-less failback and journal recovery in an active-active storage system.

FIG. 1a depicts an illustrative embodiment of an exemplary data storage environment 100, in which techniques can be practiced for providing hiccup-less failback and journal recovery in an active-active storage system. As shown in FIG. 1a, the data storage environment 100 can include a plurality of host computers 102.1, 102.2, . . . , 102.n, an active-active storage system 104, and a communications medium 103 that includes at least one network 106. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 106, storage input/output (IO) requests (e.g., small computer system interface (SCSI) commands, network file system (NFS) commands) to the active-active storage system 104, which can include a primary storage node 108, a secondary storage node 110, and a storage array 112. Such storage IO requests (e.g., write IO requests, read IO requests) can direct the primary storage node 108 and/or the secondary storage node 110 to write and/or read data blocks, data pages, data files, or any other suitable data elements to/from volumes (VOLs), logical units (LUs), file systems, and/or any other suitable storage targets, such as a plurality of storage targets 114.1, . . . , 114.m maintained in the storage array 112. For example, each of the plurality of storage targets 114.1, . . . , 114.m can be implemented using non-volatile random-access memory (NVRAM), a solid-state drive (SSD), a hard drive, a flash memory, and/or any other suitable storage device(s) for storing storage object data and/or metadata.

The communications medium 103 can be configured to interconnect the plurality of host computers 102.1, . . . , 102.n with the active-active storage system 104 to enable them to communicate and exchange data and/or control signaling. As shown in FIG. 1a, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic devices and cabling, wireless devices, and so on, or any suitable combination thereof. The communications medium 103 can be further configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable communications.

Figure 1B:
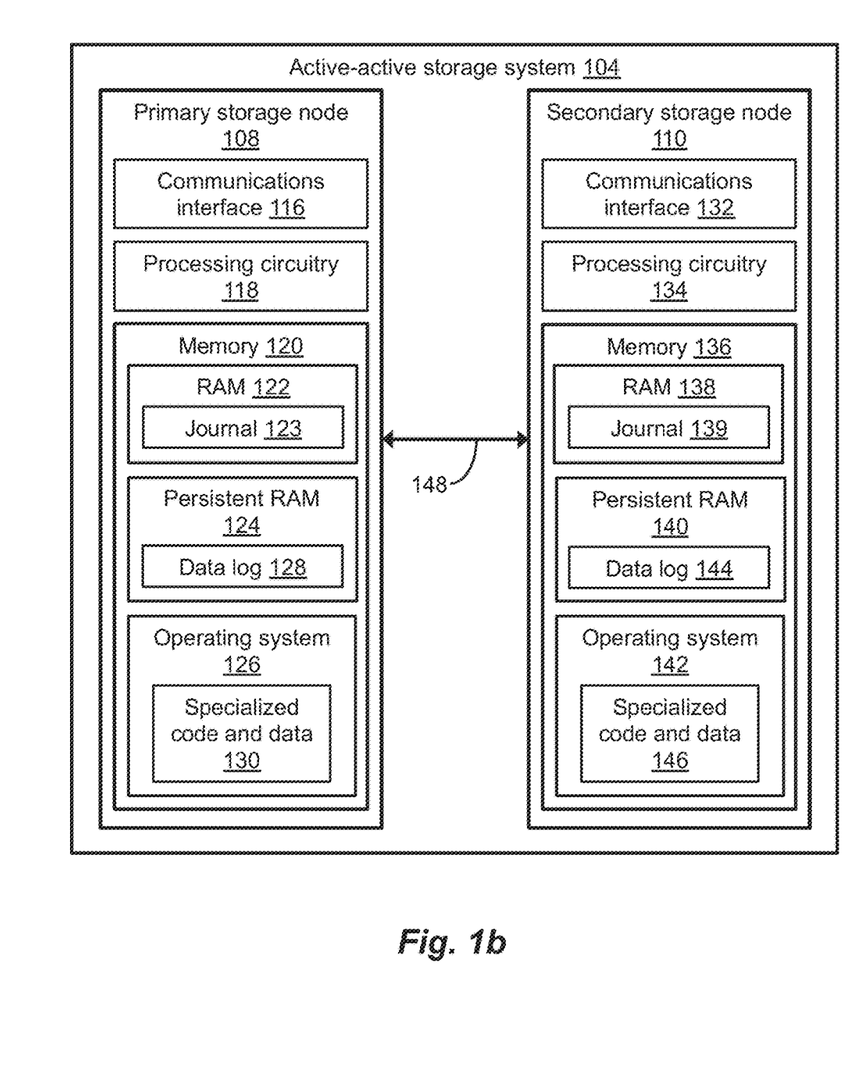

FIG. 1b depicts a detailed view of a portion of the active-active storage system 104 of FIG. 1a. As employed herein, the term "active-active storage system" refers to a highly available data storage system, in which multiple data storage nodes simultaneously have read-write IO access to the same storage objects (e.g., volumes (VOLs), logical units (LUs), file systems). As shown in FIG. 1b, the active-active storage system 104 can include at least two storage processors ("storage nodes") for high availability, namely, the primary storage node 108 and the secondary storage node 110, which is communicably connected to the primary storage node 108 by a communication path(s) 148. For example, the primary storage node 108 can receive storage IO requests from the respective host computers 102.1, . . . , 102.n over the network 106. In response to the storage IO requests, the primary storage node 108 can perform storage IO operations (e.g., read-write IO operations) to write/read data blocks, data pages, data files, or any other suitable data elements to/from one or more of the plurality of storage targets 114.1, . . . , 114.m. Further, at least at intervals, the primary storage node 108 can update and/or synchronize data (e.g., user data and/or metadata) pertaining to read-write IO operations maintained in a data log 128 by the primary storage node 108 with corresponding user data and/or metadata maintained in a data log 144 by the secondary storage node 110. For example, each data log 128, 144 can be implemented as a ring buffer, a linear buffer, a binary tree ("b-tree"), or any other suitable memory structure. In the event of a failure of the primary (or secondary) storage node or at any other suitable time, the secondary (or primary) storage node can assume the role and/or duties of the primary (or secondary) storage node with regard to the handling of storage IO requests, thereby providing high availability within the active-active storage system 104.

As further shown in FIG. 1b, the primary storage node 108 can include a communications interface 116, processing circuitry 118, and a memory 120. Likewise, the secondary storage node 110 can include a communications interface 132, processing circuitry 134, and a memory 136. Each of the communications interfaces 116, 132 can include one or more of an Ethernet interface, an InfiniBand interface, a fiber channel interface, and/or any other suitable communications interface. Each communications interface 116, 132 can further include SCSI target adapters, network interface adapters, and/or any other suitable adapters for converting electronic, optical, and/or wireless signals received over the network 106 to a form suitable for use by the respective processing circuitry 118, 134.

Each of the memories 120, 136 can include volatile memory such as a random-access memory (RAM) 122, 138 or any other suitable volatile memory, as well as persistent memory such as persistent RAM 124, 140 or any other suitable persistent memory. As shown in FIG. 1b, a journal 123 can be implemented in the RAM 122 of the primary storage node 108, and a journal 139 can be implemented in the RAM 138 of the secondary storage node 110. Further, the data log 128 can be implemented in the persistent RAM 125 of the primary storage node 108, and the data log 144 can be implemented in the persistent RAM 140 of the secondary storage node 110. Each memory 120, 136 can store a variety of software constructs realized in the form of specialized code and data 130, 146 (e.g., program instructions) that can be executed by the respective processing circuitries 118, 134 to carry out the techniques and/or methods disclosed herein. Each memory 120, 136 can further include a respective operating system 126, 142, such as a Linux operating system (OS), Unix OS, Windows OS, or any other suitable operating system.

The processing circuitries 118, 134 can include one or more physical storage processors and/or engines configured to execute the specialized code and data 130, 146, respectively, as well as data movers, director boards, blades, IO modules, storage drive controllers, switches, and/or any other suitable computer hardware or combination thereof. For example, the processing circuitries 118, 134 can execute the specialized code and data 130, 146, respectively, as program instructions out of the respective memories 120, 136, process storage IO requests (e.g., write IO requests, read IO requests) issued by the plurality of host computers 102.1, . . . , 102.n, and/or store data and/or metadata to the storage array 112 in the data storage environment 100, which can be a clustered RAID environment.

In the context of the processing circuitries 118, 134 of the respective storage nodes 108, 110 being implemented using one or more processors executing the specialized code and data 128, a computer program product(s) can be configured to deliver all or a portion of the specialized code and data 130, 146 to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

Figure 2:
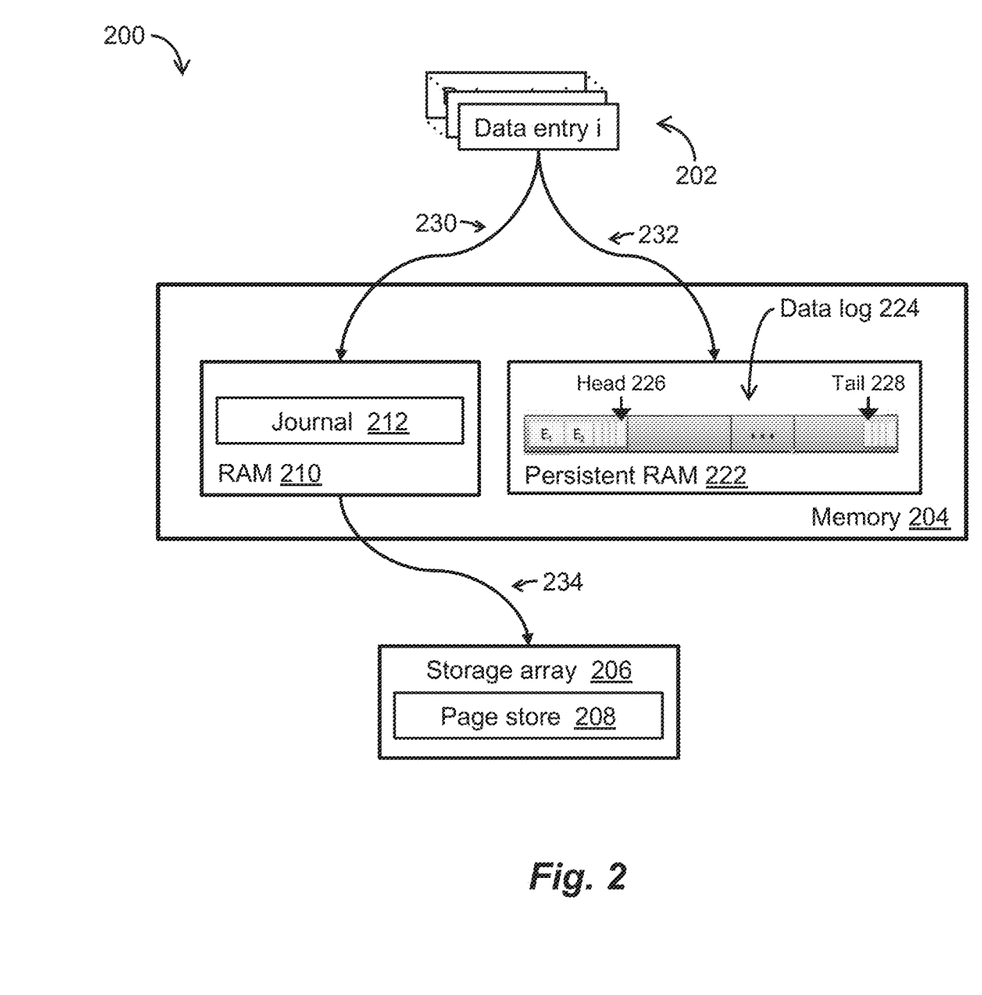

FIG. 2 depicts volatile memory, persistent memory, and storage array components that can be included in each of the primary storage node 108 and the secondary storage node 110 of the active-active storage system 104. As shown in FIG. 2, the volatile memory components can be embodied in RAM 210 and include at least one instance of a journal 212. As described herein, the processing circuitry 118 of the primary storage node 108 can execute the specialized code and data 130 as program instructions out of the memory 120, and process storage 10 requests (e.g., write IO requests, read IO requests) issued by the respective host computers 102.1, . . . , 102.n to write/read user data and/or metadata to/from the storage array 112. Likewise, the processing circuitry 134 of the secondary storage node 110 can execute the specialized code and data 146 as program instructions out of the memory 136, and process storage IO requests (e.g., write IO requests, read IO requests) issued by the respective host computers 102.1, . . . , 102.n to write/read user data and/or metadata to/from the storage array 112. Each portion of data (e.g., each data entry) can be stored to a page on the storage array 112.

As further shown in FIG. 2, the storage node 200 can write a plurality of data entries "i" to the journal 212 (as illustrated by a path 230) in the volatile memory (i.e., the RAM), and subsequently store the data entries "i" written to the journal 212 to a page store 208 (as illustrated by a path 234) included in the storage array 206. The storage node 200 can also write copies of the data entries to a persistent log or data log 224 (as illustrated by a path 232) included in the persistent RAM 222. In the event of a disaster, data loss, and/or data corruption, the storage node 200 can replay the data log 224 to apply the data entries written thereto to the journal 212 included in the RAM 210, thereby recovering the journal 212 to a consistent state. In certain implementations, the data log 224 can be configured as a ring buffer having a head pointer (also simply referred to herein as the "head") 226 and a tail pointer (also simply referred to herein as the "tail") 228. Further, the storage node 200 can write each respective data entry at the head 226 of the ring buffer, and subsequently release allocated space for the respective data entry at the tail 228 of the ring buffer. As such, the data log 224 can store the respective data entries in time order (e.g., from oldest to newest).

In the active-active storage system 104 that includes the primary storage node 108 and the secondary storage node 110, a failover process can be executed when one of the primary and secondary storage nodes 108, 110 fails or otherwise becomes non-operational. During the failover process, the primary (or secondary) storage node (i.e., the "surviving node") can continue to service storage IO requests (e.g., write IO requests, read IO requests) issued by one or more of the host computers 102.1, . . . , 102.n, as well as provide up-to-date data to the data log in its local persistent RAM. Once the non-operational secondary (or primary) storage node (i.e., the "failback node") again becomes operational, a failback process can be executed to restore the failback node from its non-operational state back to its original working state.

During the failback process, the primary storage node can write data entries to both a journal in its local volatile memory (e.g., RAM) and a persistent log or data log in its local persistent memory (e.g., persistent RAM). Further, the primary storage node can determine a position of the head pointer of the data log in its persistent RAM (also referred to herein as the "primary data log"), as well as direct the secondary storage node to place a marker at a corresponding location of the data log in its persistent RAM (also referred to herein as the "secondary data log"). In certain implementations, the marker can correspond to a data entry that includes at least a transaction identifier (ID) (e.g., a sequence ID). In response to receipt of at least one storage IO request, the primary storage node can move the head pointer of the primary data log to allocate space for at least one data entry, and direct the secondary storage node to move the head pointer of the secondary data log to allocate corresponding space for writing the data entry. In response to at least one data entry being flushed from the journal of the primary storage node to a storage array, the primary storage node can move the tail pointer of the primary data log to reclaim previously allocated space in the primary data log for at least one corresponding data entry, as well as direct the secondary storage node to move the tail pointer of the secondary data log to reclaim corresponding allocated space in the secondary data log. In response to a position of the tail pointer of the secondary data log coinciding with the location of the marker, a determination can be made that data content of the respective primary and secondary data logs are up-to-date and synchronized. The secondary storage node can then resume servicing storage IO requests (e.g., write IO requests, read IO requests) issued by the respective host computers 102.1, . . . , 102.n. In this way, synchronization of the primary data log and the secondary data log can be achieved during the failback process with reduced suspend time of the active-active storage system.

Figure 3A:
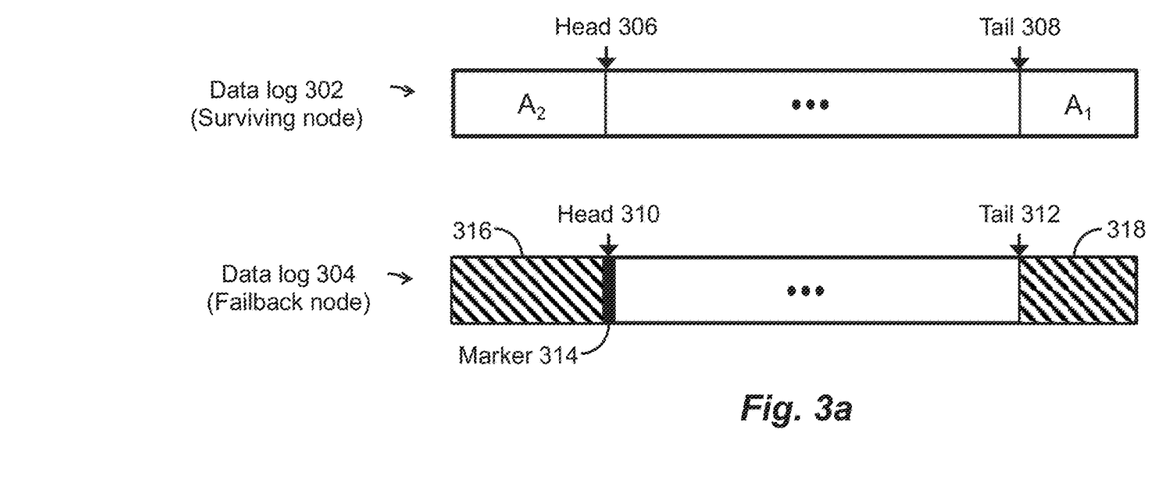
FIGS. 3a-3c are block diagrams describing an illustrative example of providing hiccup-less failback and journal recovery in an active-active storage system.
Figure 3B:
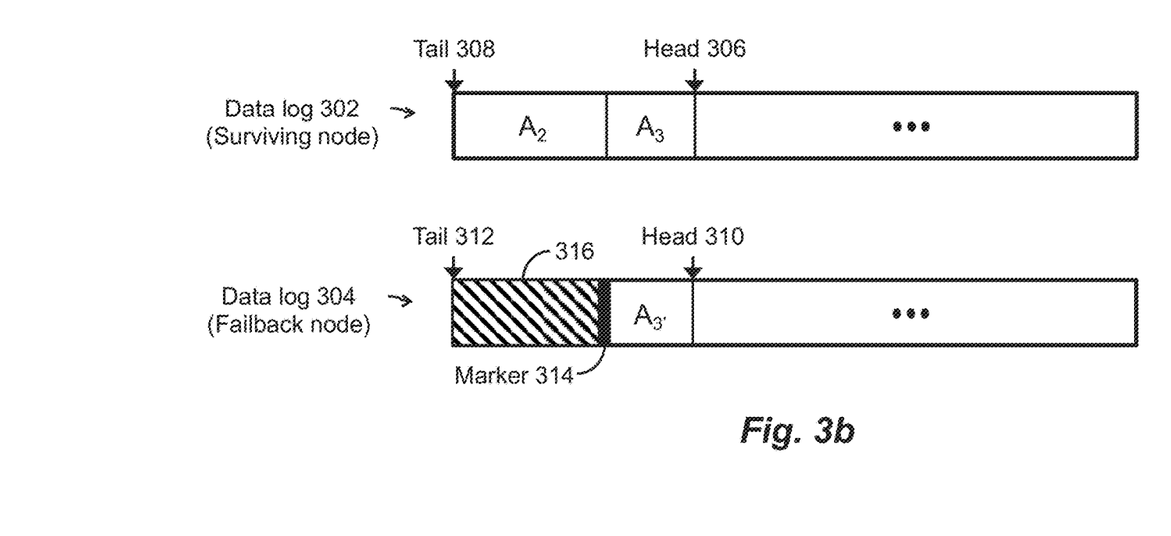
Figure 3C:
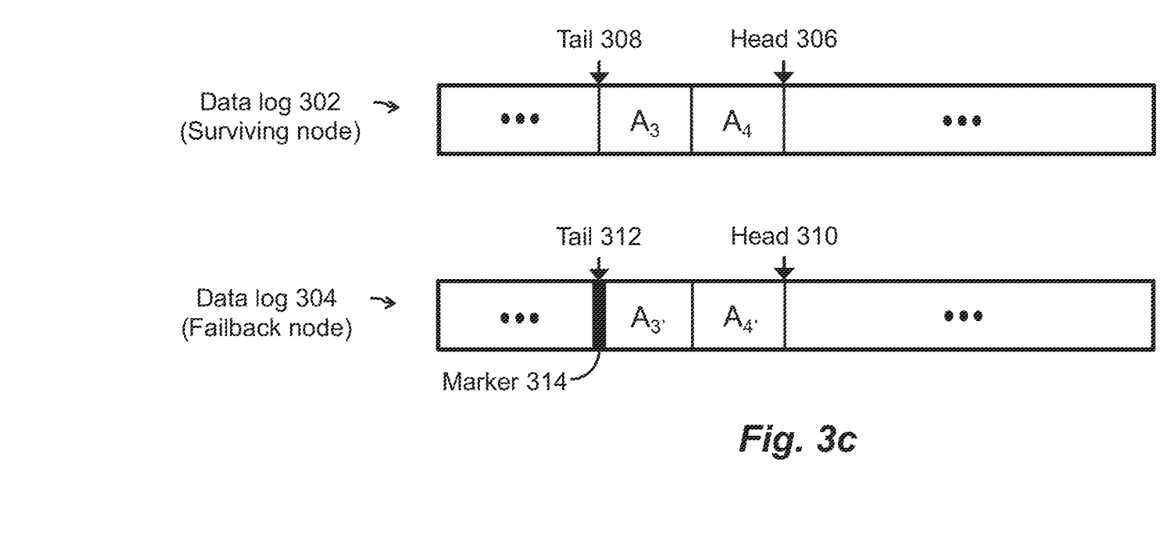

The disclosed techniques for providing hiccup-less failback and journal recovery in an active-active storage system will be further understood with reference to the following illustrative example and FIGS. 3a-3c. In this example, a failback process is executed by an active-active storage system, in which a surviving node has a data log 302 (e.g., a ring buffer) implemented in its local persistent RAM, and a failback node has a data log 304 (e.g., a ring buffer) implemented in its local persistent RAM. As shown in FIG. 3a, the data log 302 of the surviving node includes a head pointer ("head") 306 and a tail pointer ("tail") 308, as well as allocated space $A_1$, $A_2$ between the tail and head pointers 308, 306 for storing one or more data entries. Accordingly, in this example, an initial position of the tail pointer 308 corresponds to the start of the allocated space $A_1$, and an initial position of the head pointer 306 corresponds to the end of the allocated space $A_2$.

During the failback process, the initial position of the head pointer 306 of the data log 302 of the surviving node is determined, and a marker 314 (e.g., a sequence ID) (see FIG. 3a) is placed at or otherwise maintained relative to a corresponding location in the data log 304 of the failback node. In this example, it is assumed that all data entries written to the data log 304 of the failback node before the location of the marker 314 (e.g., all data entries written to at least allocated spaces 316, 318, as indicated by diagonal hash lines; see FIG. 3a) are not synchronized with the data log 302 of the surviving node. It is further assumed, in this example, that the data log 304 of the failback node includes a tail pointer 312 having a position at the start of the allocated space 318, as well as a head pointer 310 having a position at the end of the allocated space 316 (i.e., at the location as the marker 314).

As shown in FIG. 3b, in response to a first write IO request being received at the surviving node, the head pointer 306 of the data log 302 of the surviving node is moved to allocate space $A_3$ for writing at least one first data entry to the data log 302. Further, the failback node is directed by the surviving node to move its head pointer 310 to allocate corresponding space $A_{3'}$ for writing a copy of the first data entry to the data log 304. In addition, in response to at least one first data entry being flushed from a journal in RAM of the surviving node, the tail pointer 308 is moved to reclaim the previously allocated space $A_1$ for at least one corresponding data entry in the data log 302 of the surviving node. Having reclaimed the previously allocated space $A_1$, the tail pointer 308 has a resulting position at the start of the allocated space $A_2$ in the data log 302 of the surviving node. Further, the failback node is directed by the surviving node to move its tail pointer 312 to reclaim the corresponding allocated space 318 in the data log 304 of the failback node. Having reclaimed the corresponding allocated space 318, the tail pointer 312 has a resulting position at the start of the allocated space 316 in the data log 304 of the failback node.

As shown in FIG. 3c, in response to a second write IO request being received at the surviving node, the head pointer 306 of the data log 302 of the surviving node is moved to allocate space $A_4$ for writing at least one second data entry to the data log 302. Further, the failback node is directed by the surviving node to move its head pointer 310 to allocate corresponding space $A_{4'}$ for writing a copy of the second data entry to the data log 304. In addition, in response to at least one second data entry being flushed from the journal in the RAM of the surviving node, the tail pointer 308 is moved to reclaim the previously allocated space $A_2$ for at least one corresponding data entry in the data log 302 of the surviving node. Having reclaimed the previously allocated space $A_2$, the tail pointer 308 has a resulting position at the start of the allocated space $A_3$ in the data log 302 of the surviving node. Further, the failback node is directed by the surviving node to move its tail pointer 312 to reclaim the corresponding allocated space 316 in the data log 304 of the failback node. Having reclaimed the corresponding allocated space 316, the tail pointer 312 has a resulting position at the start of the allocated space $A_{3'}$ in the data log 304, which coincides the location of the marker 314. Once the tail pointer 312 reaches the location of the marker 314 in the data log 304, data content of the data logs 302, 304 in the respective surviving and failback nodes are deemed or otherwise determined to be up-to-date and synchronized. The failback node can then resume servicing storage IO requests (e.g., write IO requests, read IO requests) issued by the respective host computers. In this way, synchronization of the data logs 302, 304 of the respective surviving and failback nodes can be achieved during the failback process with reduced suspend time of the active-active storage system.

Figure 4:
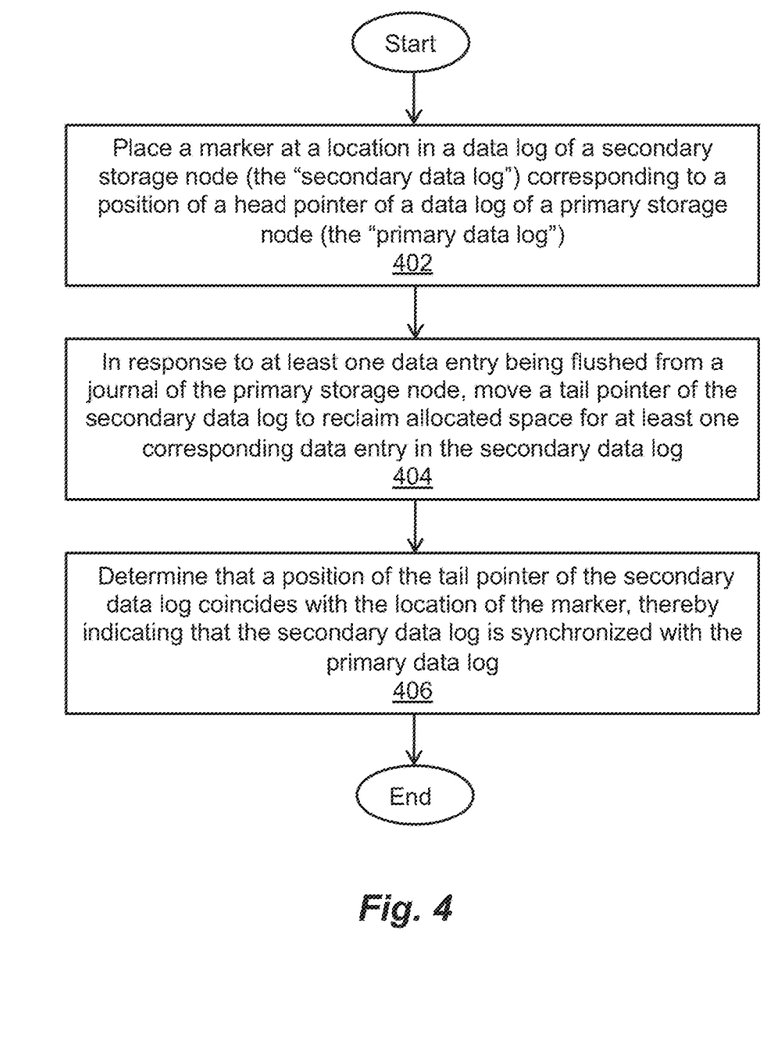
FIG. 4 is a flow diagram of an exemplary method of providing hiccup-less failback and journal recovery in an active-active storage system.

An exemplary method of providing hiccup-less failback and journal recovery in an active-active storage system is described below with reference to FIG. 4. In the exemplary method, the active-active storage system includes a primary storage node and a secondary storage node, in which each of the primary and secondary storage nodes includes a journal in RAM and a data log in persistent RAM. As depicted in block 402, a marker is placed at a location in the data log of the secondary storage node (the "secondary data log") corresponding to a position of a head pointer of the data log of the primary storage node (the "primary data log"). As depicted in block 404, in response to at least one data entry being flushed from the journal of the primary storage node, a tail pointer of the secondary data log is moved to reclaim allocated space for at least one corresponding data entry in the secondary data log. As depicted in block 406, a position of the tail pointer of the secondary data log is determined to coincide with the location of the marker, thereby indicating that the secondary data log is synchronized with the primary data log.

Having described the above illustrative embodiments, other alternative embodiments and/or variations can be made and/or practiced. For example, it was described herein that, during a failback process, an initial position of a head pointer of a data log of a surviving node can be determined, and a marker (e.g., a sequence ID) can be placed at or otherwise maintained relative to a corresponding location in a data log of a failback node. Further, in response to one or more flushing operations, allocated space can be reclaimed in the data log of the failback node until a position of a tail pointer of the data log of the failback node coincides with the location of the marker. As an alternative (or addition) to the disclosed embodiments, a surviving node can be configured to atomically perform the following operations: determine a position of a head pointer of its data log, send data entries that occur after the head pointer position to a data log of a failback node, and force one or more flushing operations to be performed. Once a tail pointer of the data log of the failback node reaches the head pointer position following one or more reclaim operations, the data log of the respective surviving and failback nodes are deemed or otherwise determined to be synchronized. The failback node then resumes servicing storage IO requests.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of providing hiccup-less failback and journal recovery in a storage cluster, the storage cluster including at least a primary node and a failback node, each of the primary and failback nodes including a data log in persistent random-access memory (RAM), the method comprising:
   in a failback process, placing a marker at a location in the data log of the failback node corresponding to a position of a head pointer of the data log of the primary node;
   in response to at least one data entry being flushed from the primary node, moving a tail pointer of the data log of the failback node to reclaim allocated space for at least one corresponding data entry; and
   determining that a position of the tail pointer of the data log of the failback node coincides with the location of the marker, thereby indicating that the data log of the failback node is synchronized with the data log of the primary node.

2. The method of claim 1 further comprising:
   in response to a first write input/output (IO) request being received at the primary node, moving the head pointer of the data log of the primary node to allocate space for writing at least one first data entry.

3. The method of claim 2 wherein a position of a head pointer of the data log of the failback node coincides with the location of the marker, and wherein the method further comprises:
   moving the head pointer of the data log of the failback node to allocate corresponding space for writing a copy of the first data entry.

4. The method of claim 3 further comprising:
   writing the at least one first data entry to the allocated space in the data log of the primary node.

5. The method of claim 4 further comprising:
   writing the copy of the first data entry to the allocated space in the data log of the failback node.

6. The method of claim 1 further comprising:
   prior to determining that the data log of the failback node is synchronized with the data log of the primary node, deferring servicing storage IO requests at the failback node.

7. The method of claim 6 further comprising:
   having determined that the data log of the failback node is synchronized with the data log of the primary node, resuming the servicing of the storage IO requests at the failback node.

8. A system for providing hiccup-less failback and journal recovery in a storage cluster, comprising:
   a primary node including a journal in volatile random-access memory (RAM), and a data log in persistent RAM; and
   a failback node including a journal in volatile random-access memory (RAM), and a data log in persistent RAM,
   wherein, in a failback process, the primary node is configured to execute program instructions to:
      place a marker at a location in the data log of the failback node corresponding to a position of a head pointer of the data log of the primary node;
      in response to at least one data entry being flushed from the journal of the primary node, direct the failback node to move a tail pointer of the data log of the failback node to reclaim allocated space for at least one corresponding data entry; and determine that a position of the tail pointer of the data log of the failback node coincides with the location of the marker, thereby indicating that the data log of the failback node is synchronized with the data log of the primary node.

9. The system of claim 8 wherein the primary node is further configured to execute the program instructions, in response to a first write input/output (IO) request being received at the primary node, to move the head pointer of the data log of the primary node to allocate space for writing at least one first data entry.

10. The system of claim 9 wherein a position of a head pointer of the data log of the failback node coincides with the location of the marker, and wherein the primary node is further configured to execute the program instructions to direct the failback node to move the head pointer of the data log of the failback node to allocate corresponding space for writing a copy of the first data entry.

11. The system of claim 10 wherein the primary node is further configured to execute the program instructions to write the at least one first data entry to the allocated space in the data log of the primary node.

12. The system of claim 11 wherein the primary node is further configured to execute the program instructions to direct the failback node to write the copy of the first data entry to the allocated space in the data log of the failback node.

13. The system of claim 8 wherein the failback node is configured to execute program instructions, prior to a determination that the data log of the failback node is synchronized with the data log of the primary node, to defer servicing storage IO requests at the failback node.

14. The system of claim 13 wherein the failback node is further configured to execute the program instructions, in response to the determination that the data log of the failback node is synchronized with the data log of the primary node, to resume the servicing of the storage IO requests at the failback node.

15. The system of claim 8 wherein the data log of each of the primary node and the failback node is configured as a ring buffer.

16. A computer program product including a set of non-transitory, computer-readable media having instructions that, when executed by processing circuitry, cause the processing circuitry to perform a method comprising:

in a failback process of a storage cluster including at least a primary node and a failback node, placing a marker at a location in a data log of the failback node corresponding to a position of a head pointer of a data log of the primary node;

in response to at least one data entry being flushed from the primary node, moving a tail pointer of the data log of the failback node to reclaim allocated space for at least one corresponding data entry; and determining that a position of the tail pointer of the data log of the failback node coincides with the location of the marker, thereby indicating that the data log of the failback node is synchronized with the data log of the primary node.

17. The computer program product of claim 16 wherein the method further comprises:

in response to a first write input/output (IO) request being received at the primary node, moving the head pointer of the data log of the primary node to allocate space for writing at least one first data entry.

18. The computer program product of claim 17 wherein a position of a head pointer of the data log of the failback node coincides with the location of the marker, and wherein the method further comprises:

moving the head pointer of the data log of the failback node to allocate corresponding space for writing a copy of the first data entry.

19. The computer program product of claim 18 wherein the method further comprises:

writing the at least one first data entry to the allocated space in the data log of the primary node; and writing the copy of the first data entry to the allocated space in the data log of the failback node.

20. The computer program product of claim 16 wherein the method further comprises:

prior to determining that the data log of the failback node is synchronized with the data log of the primary node, deferring servicing storage IO requests at the failback node; and having determined that the data log of the failback node is synchronized with the data log of the primary node, resuming the servicing of the storage IO requests at the failback node.

* * * * *